Patented Nov. 19, 1929

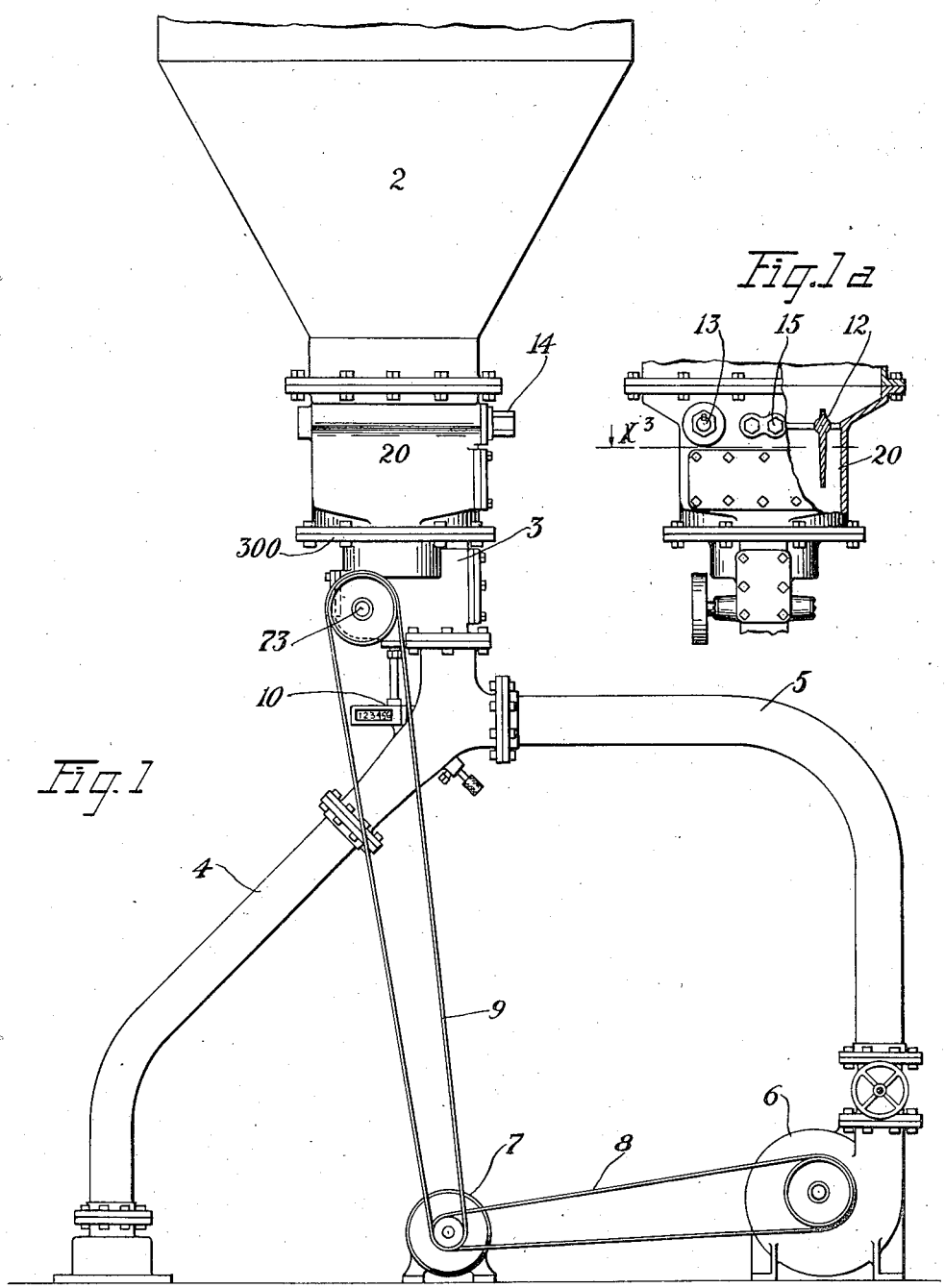

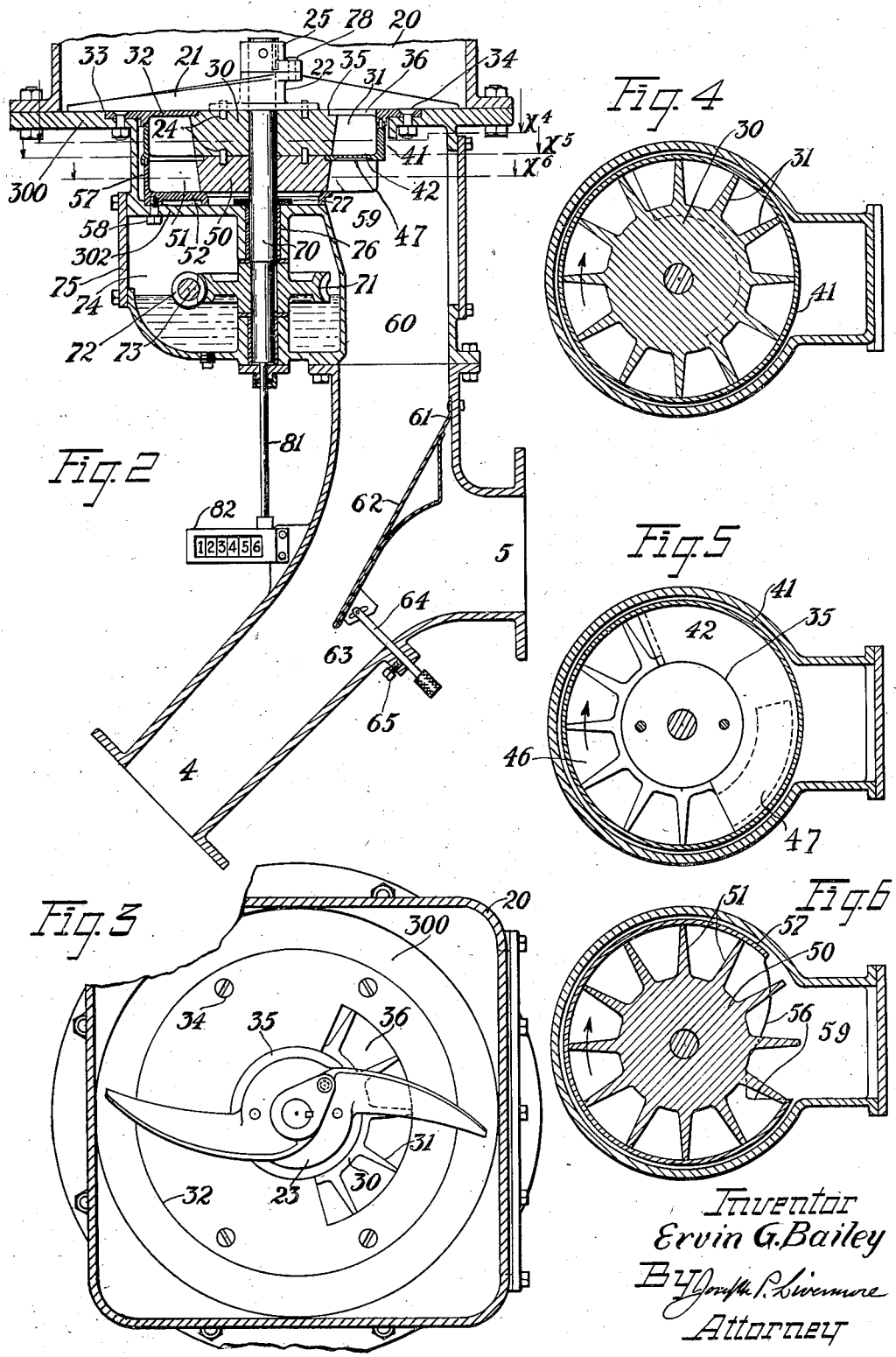

1,736,243

UNITED STATES PATENT OFFICE

ERVIN G. BAILEY, OF CLEVELAND HEIGHTS, OHIO, ASSIGNOR, BY MESNE ASSIGNMENTS, TO FULLER LEHIGH COMPANY, A CORPORATION OF DELAWARE

APPARATUS FOR FEEDING AND METERING PULVERULENT MATERIAL

Application filed April 22, 1925, Serial No. 25,150. Renewed April 5, 1929.

This invention relates to an apparatus for feeding pulverized material, and especially adapted for feeding pulverized coal into an air duct by which the air with the material in suspension therein is delivered directly to a furnace in which it is used for fuel, or to a producer by which it is converted into a fuel gas.

In the use of pulverized coal as a fuel much difficulty has been encountered because of the variation of density of the pulverized material coming to the current of air by which it is conveyed to the furnace, the material in the bin or receptacle from which it is taken having a tendency to become compacted and more or less lumpy, so that the rate by weight of feed varies and the particles are not all separated from one another when delivered to the air current, as they should be for most efficient operation.

In accordance with the present invention the pulverized material coming from the bin or receptacle is acted upon by an agitator which breaks up the lumps, and then is further acted upon by a preparing appliance which causes the separation of any small lumps or aggregations of particles coming to it by the action of air in such a manner that the particles remain separated and the voids become filled with air, so that the material leaving this preparing appliance and being delivered therefrom by gravitation will settle and accumulate in a comparatively light fluffy mass with the solid particles lightly contacting with one another, with a comparatively large and uniform distribution of air filled voids so that the particles do not adhere in groups or form lumps of a greater density than the desired or proper density for the accumulated mass.

In the continuing operation the material falling will accumulate or settle with substantially constant and uniform density so that measurement by bulk will afford a satisfactory indication of the actual amount (by weight) of solid material delivered, which can be varied as required by varying the bulk quantity rate of feed delivery.

The material thus prepared and brought by falling and settling to the desired substantially uniform density may be delivered, immediately after it has settled, by the feeding device proper which may be, and as herein shown also is a measuring device, into a duct through which it is carried by a current of air to the desired final delivery point for the powdered material.

By reason of the uniform fluffy condition of the pulverized material coming to the said feeding device the particles will be substantially uniformly distributed in the air current, which should have sufficient velocity to prevent the settling of the particles in the passage through the duct to the point of final delivery.

Fig. 1 is a general view in elevation of a complete apparatus for delivering pulverized coal, with the particles suspended in an air current, to a furnace, said apparatus containing the appliances for preparing and feeding the pulverized material forming the subject of this invention.

Fig. 1ª is an elevation of a portion of the apparatus shown in Fig. 1 as seen looking from the right with a portion broken away to show interior parts.

Fig. 2 is a vertical longitudinal section of the principal portion of the apparatus for preparing and feeding the pulverized material.

Fig. 3 is a sectional plan view of the preparing and feeding mechanism, the plane of section being indicated at X3 Fig. 1ª; and Figs. 4, 5, and 6, horizontal sectional views on lines X—4, X—5, X—6, of Fig. 2, respectively.

Referring to Fig. 1, the bin, or reservoir, in which the pulverized material to be delivered is contained is shown at 2, being vertically over the preparing and feeding appliances, shown collectively at 13 in said figure, by which the pulverized material is fed into the duct, or pipe, 4, leading to the gas producer or furnace, the current or blast of air by which the pulverized material is carried through the duct, 4, being supplied from the duct 5, through which air is forced by a blower, 6, operated by a suitable motor, 7, there being preferably variable speed transmissions, 8, between the motor and blower, and 9 between the motor and feeding appliance by which these components of the apparatus may be actuated at the proper speed to produce a fuel delivery rate according to the requirements at any time existing.

Referring now to Fig. 2, which shows the construction of the preparing and feeding mechanism located below the bin, 2, and receiving the pulverized material therefrom by gravitation, said material passes down into a connecting portion or chamber, 20, containing an agitator, 21, and thence through the aerating mechanism and feeding mechanism proper, the detailed construction of which will be hereinafter described. As shown in the present example the material is delivered by said feeding device proper at 59, (see Fig. 2) into a descending passage, 60, containing a baffle plate, 62, which tends to give the falling stream a rectangular shape in cross section, the lower edge of which plate, 62, extends into the air-duct between the supply portion, 5, and delivery portion, 4, so as to form a nozzle at 63 where the increased velocity of the air current acts thoroughly to distribute the solid particles throughout the current flowing through the delivery tube, 4, in which they remain in suspension during the passage to the furnace, gas producer, or final delivery point at which the mixture of air and pulverized fuel is utilized or consumed.

The said baffle plate 62, is affixed at its upper edge, 61, to the wall of the duct and has sufficient flexibility to admit of adjustment by an adjusting bolt or link, 64, connected with its lower end and fastened at the desired adjustment by an external set screw, 65, so that the effective sectional area of the nozzle at 63 may be varied when desired.

Referring now to the construction of the preparing or aerating appliance, best shown in Figs. 2, 3, and 4, the active component of said aerating appliance, is a wheel, 30, having around its periphery blades or teeth, 31, forming spaces or pockets around the periphery between the blades, which pockets, so far as the wheel itself is concerned, would be open at top and bottom but closed or completed on all sides by the sides of the blades and portion of the wheel periphery between them and the wall, 41, of the chamber in which the wheel rotates.

Cooperating with said wheel, 30, are two plates, 32 and 42, one above and the other below said wheel, the upper one lying in a rabbet, 33, in the top, 300, of the main casting of the feeding mechanism and being secured to said casting by bolts, 34, as shown.

Said plate, 32, extends inward over the peripheral portion of the wheel, 30, above the pocket forming blades, and has a central opening into which the hub portion of the wheel, 30, extends as shown at 35, making with the plate, 32, and the surrounding portion, 300, of the main casting a flat floor over which the arms of the agitator, 21, travel through the bottom of the mass of coal coming from the reservoir, 2.

The upper plate, 32, has an aperture, 36, through it of a width, measured radially, about equal to the radial width of the wheel pockets and of a length circumferentially less than half way around the circle by an amount equal to the length of one pocket or somewhat more, so that while more than one half of the buckets in the wheel are at any moment covered by the plate, 32, the others are uncovered at the opening, 36, and in open communication with the supply chamber above, as appears in Fig. 2, so that the coal falls into them by gravitation.

The lower plate, 42, is shown as made integral with the cylindrical wall, 41, of the chamber in which the wheel, 30, is contained and is secured between the upper plate, 32, and the wall, 57, of the chamber in which the feed wheel proper, 50, to be described later, is contained. Said plate, 42, below the wheel, 30, is provided with an aperture, 46, best shown in Fig. 5, similar in shape to the aperture, 36, in the upper plate but located at the opposite side of the axis of the wheel, thus being below the pockets which are fully covered by the upper plate and thereby cut off from communication with the supply reservoir above. The lower plate extends beneath and forms a bottom closure for the pockets which are at any time uncovered by the upper plate at the opening, 36, therethrough so that the material dropping in from above falls upon the bottom plate, 42, and fills the pockets before they again pass beneath the upper plate, which skims off any surplus and leaves the pockets full when they arrive at the opening, 46, through the lower plate in their further rotary travel.

The forwarding action of the wheel upon the material coming from the supply reservoir above will be readily understood, the pockets of the wheel filling from the reservoir above as they pass below the opening, 36, in the upper plate, and discharging from the bottom of each as they pass over the opening, 46, in the lower plate, there being a continuous delivery by gravitation although the downflow movement is momentarily interrupted while the material is being carried in the pockets from the place of inflow to the place of outflow.

The material at the bottom of the reservoir is acted upon by the arms of the agitator or distributor, 21, which action breaks any lumps and practically detaches the particles from one another, and the wheel blades, 31, in passing under the plate, 32, may contribute somewhat to such action.

In addition to, and more important than, the mechanical effect of the agitator, 21, and blades of the wheel, 30, in breaking up or reducing the lumps, is the aerating effect which will now be described.

As the apparatus is open to the air at the top and delivers into air at approximately atmospheric pressure the pulverized material when falling out from a pocket through the opening, 46, of the lower plate, 42, will leave the pocket filled with air which will enter from below to the extent that the air was displaced by the aerated or loosely piled pulverized material while in the pocket. Consequently when the pocket passes from beneath the plate, 32, and comes below the opening, 36, therethrough such air then trapped in the pocket, must be displaced by the pulverized material entering from above with the result that the air is blown into the said material with more or less eddying or churning effect as the pocket progressively emerges from beneath the plate, and thoroughly loosens and separates the particles, so that they settle into the pocket in a light, aerated, fluffy condition with each particle practically separated from all its neighbors by air, which thus thoroughly fills the voids between the particles when they have settled or come to rest in a pile under the action of gravity.

This aerating action gives the material delivered from it a light, fluffy character as contrasted with the more dense and lumpy condition of the material compacted by gravity in the bin from which it is taken and I have consequently called the active component a fluffing wheel and the upper and lower plates which cooperate therewith to effect the aeration and produce the fluffy condition, the upper and lower fluffing plates.

There is sufficient time in the passage of each pocket from the point where it emerges from beneath the plate, 32, to the point where it begins to come over the opening, 46, in the lower plate, 42, for the material to settle and fill the pocket with the comparatively light fluffy material, with a definite density which remains very nearly constant in the successive pockets as the operation goes on.

The light, fluffy aerated material thus accumulates in each pocket of the fluffing wheel and is delivered therefrom to the feed wheel proper, 50, which is similar in construction and mode of operation to the fluffing wheel, 30.

Said feed wheel, 50, has peripheral blades, 51, the spaces between which form pockets similar to those in the fluffing wheel, and said feed wheel operates between the apertured fluffing plate, 42, above it and the horizontal plate, 52 below, which is practically the bottom or floor of the portion of the apparatus containing the fluffing and feeding appliances thus far described. Said horizontal bottom plate, 52, is provided with a port or opening, 56, (see Fig. 6) over the delivery passage, 60, through which the material falls by gravitation from the pockets into said delivery passage, as the pockets successively pass over the port, 56, in the rotation of the wheel.

Said port, 56, is made of somewhat irregular shape, as shown in Fig. 6, being narrow and located towards the outer periphery of the wheel at the point where the pockets first come over the port in the rotation of the wheel and gradually widening to the full width of the pockets, with the result that the contents of the pocket are gradually and uniformly discharged into the outlet passage instead of being dumped in a mass as the pocket passes over the port.

The unapertured part of the lower fluffing plate, 42, lies over the portion of the periphery of the feed wheel which is above the discharge port, 56, said plate thus closing the pockets at the top at the point where they are passing the discharge port, 56, and delivering the material from the pockets therethrough.

In the mechanical construction shown the bottom plate, 52, is made in an integral casting with the cylindrical portion, 57, which constitutes the peripheral wall of the chamber in which the feeding and measuring wheel, 50, operates. This casting forming the bottom and side wall of the chamber for the feed wheel, 50, is assembled with the casting containing the lower fluffing plate, 42, and side wall of the chamber for the fluffing wheel, 30, between the top plate, 32, and a horizontal web, 302, (see Fig. 2) in the main casting of the preparing and feeding mechanism, the middle casting, 41, 4°, being doweled to the lower casting, and the latter being secured to the web, 302, by bolts or capscrews as indicated at 58.

The side wall portion of the chamber of the feed wheel is discontinued around the portion of the bottom plate occupied by the discharge port, 56, so that the material may flow outward from the peripheral side of a pocket as well as downward through the bottom thereof.

The pockets of the fluffing wheel are of larger capacity than the pockets of the feed wheel, the fluffing wheel being of greater vertical thickness than the feed wheel, which insures the complete filling of the feed wheel pockets, while any surplus is skimmed off by the plate, 42, and carried forward by the fluffing wheel over the plate, 42, and remains as a part of the next filling of the fluffing wheel pocket.

It will be apparent that the feed wheel, 50, has an aerating and fluffing effect similar to that of the fluffing wheel as above described. The pockets upon arriving at the aperture, 46, in the lower fluffing plate, 42, will be full of air which will be displaced and pass up into the pocket of the fluffing wheel through the fine coal falling from the fluffing wheel into the feed wheel and will thus agitate the material, which however has time to settle in the pocket of the feed wheel before again passing under the plate, 42, which will leave the feed wheel pocket even full of the material at the proper density for correct quantity delivery rate corresponding to and variable with the speed of rotation of the feed wheel.

Thus not only are uniform density and consequently correct metering of the material assured, but also the material is delivered into the conveying air blast in proper condition to be uniformly distributed therein and to remain in suspension to the point of final delivery.

The wheel pockets with the solid material repeatedly filling and emptying them in effect act as a pump which forces air from the discharge point for the material up through the descending material into the mass of material coming down from the reservoir and enters said material at the point where the agitator, 21, is stirring through the material thus greatly enhancing the effect of said agitator in separating the particles, which action is completed by the air eddying through the material before it settles in the wheel pockets.

While it is immaterial, so far as the invention is concerned, what means or mechanism may be used for actuating the various moving parts hereinbefore described, the construction of the actuating mechanism as herein shown is as follows:

The fluffing wheel, 30, feed wheel, 50, and agitator, 21, are all actuated by a main vertical shaft, 70, having connected thereto a worm wheel, 71, meshing with and adapted to be actuated by a worm, 72, driven by a shaft, 73, (see Fig. 1) at the desired speed, which may be varied automatically by any suitable regulating mechanism or otherwise according to the requirements, or rate of delivery of the pulverized material desired.

Said worm gear and worm wheel are enclosed in a tight chamber, 74, in the main casting (see Fig. 2 shown as having a removable cover, 75, and may run in a bath of oil contained in the lower part of the said chamber and also serving to lubricate the bearings for the lower portion of the shaft, 70.

Above the driving gearing and oil reservoir the shaft, 70, extends through a bushing or bearing, 76, provided with suitable packing, 77, at its upper end below the feed wheel, 50, and bottom plate, 52, of the chamber in which it operates, which protect the driving mechanism from entrance of the powdered material.

The feed wheel, 50, is loose on the shaft, 70, and rests on the bottom plate, 52, while the intermediate plate, that is, the lower fluffing plate, 42, rests upon said feed wheel, 50, and its chamber, 57, the hub portion of the wheel, 50, extending up through a central opening in said plate, 42, and together with this plate, 42, supporting the fluffing wheel, 30, which is also loose on the shaft, 70.

The agitator, 21, has a hub portion, 22, with a base flange, 23, also loose upon the shaft, 70, and resting upon the hub of the fluffing wheel, 30.

The several hubs of the feed wheel, fluffing wheel and agitator are interlocked for rotary movement by dowel pins, 24, as shown in Fig. 2, so that all of these components necessarily rotate in unison and the power is transmitted from the shaft, 70, by a hub, 25, pinned or keyed to the shaft and connected with the agitator, 21, by a comparatively weak key or shear pin, 78, which affords an adequately strong connection for driving all of the parts under normal conditions, but would be sheared off and release the driving shaft without breaking any of the parts, in case a solid piece or other obstruction were caught by any of the moving parts, or in case there should be any other accidental obstruction to the movement of the moving parts.

Suitable hand openings with removable cover plates are provided, as shown, where required to afford access to the internal components to the apparatus.

The lower end of the feed wheel shaft, 70, is shown as connected by a shaft, 81, with a counting mechanism, 82, (see Fig. 2) of any suitable or usual construction, so that the apparatus while serving to feed the material in proper condition to be thoroughly and uniformly distributed in the air current by which it is conveyed to the final delivery point, also serves as a meter for keeping account of the amount of material delivered.

The fluffing wheel, feed wheel, and plates between which they operate are the only parts subjected to appreciable wear, which may be more or less according to the character of the material in which they operate, and these parts may have to be renewed from time to time.

The assemblage is such that the casting in which they are contained can readily be disconnected and removed from beneath the casting, 20, below the reservoir hopper to afford access for renewal of the wheels or plates as may be required. In order that this may be done without having first to empty the reservoir, the intermediate chamber formed by the casting, 20, is provided with a pair of gates, 12, (see Fig. 1ᵃ) which may be closed to prevent the escape of the coal when the preparing and feeding mechanism is disconnected and removed.

The said gates are each supported on a shaft, 13, pivotally mounted in the casting and extending through the same and having at the outside a suitable head, 14, provided with wrench faces, or otherwise having provision for engagement by a wrench or lever by which it may be turned to bring the gate across the bottom outlet of the hopper, in which position it may be retained by a suitable stop, 15, shown as having a screw shank by which it can be moved to position to hold or to release the gate.

I have discovered that by having the gates pivoted eccentrically, as shown, they can be operated more easily in the mass of coal, and when open they afford less obstruction to downward flow of the coal than gates having the usual central pivotal axis and there is no tendency for them to be partially or wholly closed by such irregularities of pressure, movement, or condition of the coal as might turn a centrally pivoted gate.

The mechanical operation of the apparatus is apparent from the foregoing description of the construction.

Power being applied to the blower, 6, the current of air is forced through the pipes, 5, 4, issuing as a flat jet from the nozzle, 63, with a relatively high velocity and there encountering the particles of pulverized material falling from the preparing and feeding mechanism through the discharge passage, 60, and carrying the said particles suspended in a current of air through the delivery pipe, 4, with uniform distribution and velocity sufficient to prevent any settling of the particles to the bottom of the tube.

Power applied to the shaft, 73, causes vertical shaft, 70, to rotate at the desired speed and rotates the several rotating elements supported on that shaft which act upon the material as it descends through or past them as has been described.

The agitator, 21, serves to break up lumps and eliminate any adhesion that may have come about in the mass in the reservoir and also acts to distribute the material over the floor of the reservoir including the plate, 32, in case the material failed at any moment to descend uniformly to said floor.

The relative arrangement of the fluffing plates and fluffing wheel cause the downward movement of material to be intermittent at this point, although taken as a whole there is a substantially constant inflow of material from above and outflow below the wheel.

The same is true of the action in the feed wheel proper which has a similar loosening and aerating effect to that of the fluffing wheel and plates, and in which the pocket travels a sufficient time before entering the space below the lower fluffing plate to become filled with the material at the density which it has when settling from a condition of suspension in the air.

The fluffing wheel and plates serve to prepare the material or bring the more or less compact and lumpy powdered material to the condition in which its particles are separated and individually surrounded with air and in suitable condition to be carried in supension in an air current to the point of consumption.

Without such preliminary treatment it would be difficult, or practically impossible, to regulate closely the rate of feed, but when thus aerated and then permittted to settle for a moment it acquires a mass of uniform density capable of being measured with a considerable degree of accuracy and delivered at any desired rate within wide limits by a corresponding regulation of the speed and movement of the feed wheel.

In some cases, especially when operating at an exceptionally high rate of speed, the material settling into the pockets of the feed wheel might not have time fully to expel the air into the space from which the material is falling so that the pockets of the feed wheel might not be filled completely, which might cause inaccuracy in, or require correction of, the metering.

In order to prevent such action an air vent is provided as shown at 47 in Fig. 2, and in dotted lines in Fig. 5, which permits some of the air to pass back into the delivery space 59 as the pockets emerge from beneath the plate 42 and the material begins to fall into them from the pockets of the fluffing wheel above.

I claim:—

1. An apparatus for feeding pulverized material, comprising a bin or reservior for the material to be fed; a preparing appliance located below the same, comprising a number of pockets, and an apertured cover plate between said pockets and the supply reservoir, which covers a portion of the pockets and leaves the others in communication through the aperture with the reservoir, and a similar apertured plate below the pockets, covering the lower ends of said pockets where uncovered by the upper plate and leaving the lower ends uncovered where covered by the upper plate; means for producing a relative movement of said pockets and said cover plates whereby the pockets are alternately uncovered at top while covered below and uncovered below while covered at the top, and an air vent for said pockets in the lower side of said first named cover plate.

2. An apparatus for preparing and feeding pulverized fuel, comprising a reservoir for the material to be fed; combined with a preparing appliance below said reservoir, comprising a rotatory wheel having pockets around its periphery open at top and bottom; a stationary apertured plate above said wheel, and a simliar apertured plate below said wheel, the apertures in said plates being located at opposite sides of the wheel axis, whereby in the rotation of the wheel the pockets are placed in communication with the reservoir above when they are closed below, and are in communication with the space below, cut off from communication with the reservoir by the plate above, and an air vent for said pockets in the lower side of said first named cover plate.

3. The combination with a supply bin for powdered material of a preparing appliance comprising a rotatory pocketed wheel and apertured plates above and below the same, alternately covering and uncovering the said pockets at top and bottom as the wheel rotates; and a pocketed discharge wheel below the lower of said plates, and a bottom plate below said discharge wheel constituting a closure for the bottoms of the pockets below the aperture of the plate above, said bottom plate having a delivery aperture located below the unapertured portion of the plate immediately above the discharge wheel.

4. An apparatus for feeding pulverized material, comprising a discharge wheel rotatable in a horizontal plane, having peripheral blades forming pockets between them open at top and bottom, and a bottom plate below said wheel which closes the lower ends of said pockets, said closure having a discharge port longer than the peripheral length of one of the pockets and narrower than the radial width of said pockets near one end and increasing to a width substantially equal to the radial width of the pockets at the other end, and an apertured plate above said wheel covering the upper ends of said pockets where they are in communication with said discharge port.

5. The combination with a supply reservoir for powdered material, of a preparing appliance comprising a rotatory pocketed fluffing wheel and apertured plates above and below the same; and a delivery wheel below the lower of said plates, having similar pockets but of less capacity than those of the fluffing wheel; and an apertured bottom plate below the delivery wheel, the apertures of said plates being alternately located at opposite sides of the axis of the wheels; and a common driving shaft for both wheels, whereby they may be rotated in unison.

6. The combination with a supply bin for powdered material, of a preparing device composed of a rotatory fluffing wheel having pockets around its periphery open at top and bottom; and a similarly pocketed delivery wheel; and apertured plates, one above the fluffing wheel; one between the wheels and one below the delivery wheel, the apertures thereof being alternately located at opposite sides of the axis of the wheels; a driving shaft common to both wheels; and an agitator also driven by said shaft and located above the plate over the fluffing wheel.

7. The combination with a supply bin for powdered material of a preparing device composed of a wheel having pockets around its periphery open at top and bottom; and a similarly pocketed delivery wheel; and apertured plates, one above the preparing wheel, one between the wheels and one below the delivery wheel, the apertures thereof being alternately located at opposite sides of the axis of the wheels; a driving shaft common to both wheels, and an agitator also driven by said shaft and located above the plate over the preparing wheel; said wheels and agitator being loose upon said shaft, but engaged with one another for rotation in unison, and an easily breakable connection between said driving shaft and the rotatory components mounted thereon of sufficient strength to drive the same under normal working conditions but adapted to break and permit the shaft to continue to rotate if the movement of the rotatory components thereon is abnormally obstructed.

8. The combination of a reservoir for pulverized material; a passage leading downward therefrom; and delivering appliances below said passage; with a pair of eccentrically pivoted gates in said passage, located near the sides thereof whereby the middle portion of the passage is wholly unobstructed when said gates are open.

9. An apparatus for feeding pulverized fuel comprising a rotary wheel having pockets around its periphery open at top and bottom, a stationary plate below said wheel, a similar wheel below said plate, a similar plate below said second named wheel, said plates being provided with openings out of line with each other, and a vent along the lower surface of said second named plate for said second named wheel.

10. An apparatus for feeding pulverized material, comprising a bin or reservoir for the material to be fed; a preparing appliance located below the same, comprising a number of pockets, and an apertured cover plate between said pockets and the supply reservoir, which covers a portion of the pockets and leaves the others in communication through the aperture with the reservoir, an agitator located in the lower portion of said bin in proximity to said cover plate, and a feeding device comprising a number of pockets located below said preparing appliance.

11. An apparatus for feeding pulverized material comprising a chamber for material to be fed having an outlet at the bottom, an apertured plate at the end of said outlet, an agitator rotatable along the upper surface of said plate in close proximity thereto, a rotatable member having peripheral pockets open at their tops and bottoms below said plate, an apertured plate below said rotatable member, the apertures in said last named plate being displaced circumferentially with respect to the apertures in said first named plate.

12. An apparatus for feeding pulverized material comprising a chamber for material to be fed having an outlet at the bottom, an apertured plate at the end of said outlet, an agitator rotatable along the upper surface of said plate and having an arm with a flat lower surface in close proximity thereto, a rotatable member having peripheral pockets open at their tops and bottoms below said plate, an apertured plate below said rotatable member, the apertures in said last named plate being displaced circumferentially with respect to the apertures in said first named plate.

ERVIN G. BAILEY.